US008806223B2

(12) United States Patent
Crowe (10) Patent No.: US 8,806,223 B2
(45) Date of Patent: Aug. 12, 2014

(54) SYSTEM AND METHOD FOR MANAGEMENT OF ENCRYPTED DATA

(76) Inventor: Douglas Norman Crowe, San Ramon, CA (US)

(*) Notice: Subject to any disclaimer, the term of this patent is extended or adjusted under 35 U.S.C. 154(b) by 0 days.

(21) Appl. No.: 13/461,462

(22) Filed: May 1, 2012

(65) Prior Publication Data

US 2012/0284529 A1 Nov. 8, 2012

Related U.S. Application Data

(60) Provisional application No. 61/481,825, filed on May 3, 2011.

(51) Int. Cl.
*G06F 17/30* (2006.01)
*G06F 21/72* (2013.01)
*G06F 21/10* (2013.01)

(52) U.S. Cl.
USPC .............................. 713/189; 726/27; 707/752

(58) Field of Classification Search
CPC ............ G06F 2221/2107; G06F 17/30; G06F 17/30315
USPC ........................................... 726/27; 707/752
See application file for complete search history.

(56) References Cited

U.S. PATENT DOCUMENTS

| | | | |
|---|---|---|---|
| 6,807,609 B1* | 10/2004 | Lemmon et al. | 711/150 |
| 6,895,549 B1* | 5/2005 | Albright et al. | 715/247 |
| 7,251,625 B2* | 7/2007 | Anglum | 705/35 |
| 2005/0146951 A1* | 7/2005 | Horai et al. | 365/200 |
| 2006/0265395 A1 | 11/2006 | Raman et al. | |
| 2007/0088705 A1* | 4/2007 | Chen et al. | 707/10 |
| 2008/0052641 A1 | 2/2008 | Brown et al. | |
| 2008/0082834 A1* | 4/2008 | Mattsson | 713/189 |
| 2008/0133935 A1* | 6/2008 | Elovici et al. | 713/193 |
| 2008/0165970 A1* | 7/2008 | Chung et al. | 380/277 |
| 2008/0229428 A1* | 9/2008 | Camiel | 726/27 |
| 2009/0083544 A1* | 3/2009 | Scholnick et al. | 713/186 |
| 2009/0147960 A1* | 6/2009 | Maeda et al. | 380/277 |
| 2009/0198675 A1* | 8/2009 | Mihalik et al. | 707/5 |
| 2010/0161995 A1* | 6/2010 | Browning | 713/189 |

(Continued)

FOREIGN PATENT DOCUMENTS

RU 2367010 9/2009

OTHER PUBLICATIONS

Ali et al. "Update Query Over Encrypted Data", 2011, IEEE, p. 279-282.*

(Continued)

*Primary Examiner* — Eleni Shiferaw
*Assistant Examiner* — Demaris Brown
(74) *Attorney, Agent, or Firm* — Peacock Myers, P.C.; Jeffrey D. Myers (57) ABSTRACT

A method of using synchronized search and order data structures to access a collection of data comprising organizing the search data structure by encrypted key value, wherein the search data structure contains only references to elements in the collection and their associated encrypted keys, organizing the order data structure by unencrypted key value, wherein the order data structure contains only references to elements in the collection and their associated encrypted keys, exposing a maximum of two pieces of clear text data during operations on the collection, engaging in insert or delete operations, engaging in update operations; engaging in search operations, engaging in sort operations, engaging in merge operations, and reporting the results of those operations to the user.

14 Claims, 6 Drawing Sheets

(56) References Cited

U.S. PATENT DOCUMENTS

| | | |
|---|---|---|
| 2011/0066629 A1* | 3/2011 | Escalante et al. ............. 707/765 |
| 2011/0161293 A1* | 6/2011 | Vermeulen et al. ........... 707/626 |
| 2012/0016837 A1* | 1/2012 | Matsuda et al. ............. 707/609 |
| 2012/0054650 A1* | 3/2012 | Bliss et al. .................... 715/764 |

OTHER PUBLICATIONS

Bickerstaff et al., "Building GUI Database Applications with Javabeans and JDBC", Dec. 2004, ACM, p. 176-178.*

Bickerstaff et al., "A Light-Weight Software Engineering Approach to Developing Small-Scale Information Systems Using .NET 2.0", Dec. 2006, ACM, vol. 22, Issue 2, p. 27-29.*

Lu et al., "XBase: Making Your Gigabyte Disk Queriable", ACM, Jun. 2012, p. 630.*

Hammer, Joachim, et al., Data Structures for Databases, [online] 2001 [retrieved on Jun. 13, 2012]. Retrieved from the Internet: <URL: http://www.cise.ufl.edu/~mschneid/Research/papers/HS05BoCh.pdf>.

* cited by examiner

SYSTEM AND METHOD FOR MANAGEMENT OF ENCRYPTED DATA

CROSS-REFERENCE TO RELATED APPLICATIONS

This application claims priority to and the benefit of the filing of U.S. Provisional Patent Application Ser. No. 61/481,825, entitled "System and Method for Management of Encrypted Data", filed on May 3, 2011, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to the field of database or file accessing, and more particularly to efficiently sorting or searching an encrypted database while it remains encrypted.

2. Description of Related Art

Stored data frequently requires privacy, either as a result of regulatory obligations, or for business reasons. Laws, such as HIPAA, and banking regulations, require secure treatment of personal information. Business information, such as trade secrets, must generally be kept hidden from competitors.

Currently available database systems are unable to provide adequate protection, as most of these systems store the database on disk in unencrypted form. Theft of confidential personal or business information typically occurs from unencrypted databases, often stored on an easily stolen laptop computer, or on an electronically compromised server. This exposes the owner of the stolen data to liability, as well as exposing the personal information in the database to the thief, often resulting in identity theft.

Encrypting databases can provide a superior way of preventing data loss, even if the data storage system is stolen, or the server is electronically penetrated, so long as the data remains in an encrypted form. This process, however, typically leads to operational problems, mostly related to sorting and searching the database.

Sorting and searching an encrypted database typically requires decrypting the data, either by decrypting the entire database, or decrypting some, or all, of the data "on the fly". This requires significant computational overhead, and exposes at least some of the data in unencrypted form.

Those few systems which do encrypt the database typically decrypt it on disk when the first user opens the database, and encrypt it again when the last user closes the database. This leaves the data on the file system in unencrypted form for as long as the system is in use. In many on-line financial processing and banking applications this may result in data being continuously exposed in unencrypted form on external storage media, 24 hours a day, 7 days per week. Depending on the storage system, fragments of temporary files containing unencrypted data may also remain exposed on external storage until those storage fragments are re-allocated by the operating system and over-written.

If unencrypted data is stored on a disk it is easily "readable" by a thief. If the system "crashes", is put in "hibernate" mode, or is improperly shut down, the data on disk will remain in unencrypted form, and thus, will be vulnerable to theft. Operating systems using virtual memory present a problem, since memory page files are written to disk. This exposes any unencrypted data that was held in RAM to discovery by a clever thief. This implies that a minimal amount of unencrypted data should be kept in protected working memory, (i.e. RAM, or internal registers), by the database system.

The present invention is designed to minimize the exposure of unencrypted data, while keeping computational overhead to a minimum. The strategy used is to keep the data encrypted as much as possible, to minimize exposure of the data in unencrypted form, and to never store the unencrypted data on external storage, i.e. disk.

Other approaches have severe limitations that render them not as generally useful as the present invention. An order preserving cryptographic algorithm is difficult, or impossible, to implement, due to the order destroying requirements of a cryptographic system. While some progress has been made in creating such an algorithm (see, e.g., U.S. Patent Publication No. 2005/0147240), it is not currently believed to be general enough, or of sufficient strength, to make it adequate for high security applications.

The present invention does not suffer from this sort of cryptographic weakness, as the invention is implemented using a cryptographic plug-in, which may be optimized for security.

On The Fly Encryption (OTFE) is the process of encrypting and decrypting all of the data on a disk, either through hardware or firmware, (in the disk subsystem), or through software, (in the disk device driver) as the data is read or written.

Overhead, in either hardware or software implementations of OTFE, is much greater than that incurred with the present invention. A hardware solution is also generally more expensive than a software solution, and is often more difficult to implement in an existing system.

BRIEF SUMMARY OF THE INVENTION

The present invention is of a method of using synchronized search and order data structures to access a collection of data stored on a non-transitory computer-readable medium, comprising: organizing the search data structure by encrypted key value, wherein the search data structure contains only references to elements in the collection and their associated encrypted keys; organizing the order data structure by unencrypted key value, wherein the order data structure contains only references to elements in the collection and their associated encrypted keys; exposing a maximum of two pieces of clear text data during operations on the collection; engaging in insert or delete operations by searching and updating the search data structure and the order data structure to insert or delete associated elements of the collection; engaging in update operations by searching the search data structure for the desired elements of the collection and updating their associated values; engaging in search operations by searching the search data structure according to a search key; engaging in sort operations by searching the order data structure to locate a range of values and then traversing the order data structure in a desired direction; engaging in merge operations by traversing and selecting entries from two or more order data structures; and reporting the results of those operations to the user. In the preferred embodiment, employing an application program interface and a plug-in architecture for data structure and cryptographic operations to minimize dependence on specific implementations. The method is implementation independent as to choice of either or both of hardware and software. The search and order data structures can be combined to comprise a composite data structure. Organizing the order data structure employs key obfuscation, most preferably one or more of key salting, key bit re-ordering, or key bit spreading. The invention can additionally comprise of clearing the working memory of a computer comprises executing the method after a data structure operation is complete, executing the method on a computer employing protected working memory, and/or executing the method on a computer employing protected processes. The collection of data can be a collection of encrypted data and/or is a collection of unencrypted data. Engaging in sort operations can comprise engaging in multi-column sort operations, engaging in insert operations can comprise employing insertable position values, and engaging in sort operations can comprise engaging in an internal or external sort and wherein engaging in merge operations comprises engaging in an internal or external merge.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is designed to minimize the exposure of unencrypted data, while keeping computational overhead to a minimum. The strategy used is to keep the data encrypted as much as possible, to minimize exposure of the data in unencrypted form, and to never store the unencrypted data on external storage, e.g., disk.

The invention described herein allows for the efficient, secure, storage and retrieval of encrypted data operated on by an associated database management system, and comprises data structures and operational methods designed to support searches and sorts on that encrypted data while that data remains in encrypted form. This invention is independent of both the form of the associated database, and the method of encryption. It is designed to be integrated into an associated database management system.

DEFINITIONS, ACRONYMS, AND ABBREVIATIONS

Terms used throughout this description are as defined in the American National Standard Dictionary of Information Technology (ANSDIT), ANSI/ISO/IEC 9075:1999, and NIST IR-7298, unless otherwise specifically indicated.

In a database management system (DBMS), data is stored in one or more data containers. Each data container contains records. The data within each record is organized into one or more fields. In a relational database system (RDBMS), the data containers are referred to as tables, the records are referred to as rows, and the fields are referred to as columns.

Systems that implement the present invention are not limited to any particular types of data structures. However, for the purpose of explanation, the examples and terminology used herein shall be that typically associated with relational databases. Thus, the terms "table", "row" and "column" shall be used herein to refer respectively to the Storage Data Structure 110, a record within that structure, and a field within that record. Any data structure in which groups of related fields are associated into records may be used.

The term "record" is equivalent to the term "row", and each term may be used interchangeably.

The term "field" is equivalent to the term "column", and each term may be used interchangeably.

Acronyms and Abbreviations
ANSI American National Standards Institute
API Application Program Interface
DBMS Database Management System
HIPAA Health Insurance Portability and Accountability Act
IEC International Electrotechnical Commission
ISO International Standards Organization
JTAG Joint Test Action Group
NIST National Institute of Standards and Technology
OTFE On-The-Fly Encryption
RAM Random Access Memory
RDBMS Relational Database Management System
SQL Structured Query Language

REFERENCES

"American National Standard Dictionary of Information Technology (ANSDIT)"
On-line at: http://www.incits.org/ANSDIT/Ansdit.htm
As accessed on 2011-01-10
"Database Language SQL"
International Standard ANSI/ISO/IEC 9075:1999
"Glossary of Key Information Security Terms"
NIST IR-7298; Kissel, Richard, editor; Apr. 25, 2006
"The Art of Computer Programming, Vol. 3: Sorting and Searching, Second Edition"
Knuth, Donald; Reading, Mass.: Addison-Wesley, 1998
"Algorithms And Theory Of Computation Handbook"
Edited by Mikhail J. Atallah; CRC Press LLC—1999
"Literary Machines"
Nelson, Ted; Mindful Press—1988
"System and Method for Order-preserving Encryption of Numeric Data"
United States Patent Application Publication 2005/0147240 A1, Jul. 7, 2005
Operational Requirements The Database Operations supported by the present invention, described in terms of ANSI/ISO/IEC standard SQL, must include:
operations performed by the CREATE statement,
operations performed by the INSERT statement,
operations performed by the DELETE statement,
operations performed by the UPDATE statement,
operations performed by the SELECT statement, and
operations performed by the ORDER BY clause of the SELECT statement.

Note that while these operations are described in terms of SQL, no particular implementation of a database is implied by these descriptions, and they should be considered only as generic examples of typical database operations. Similar operations can be established for NoSQL database systems, etc.

Sorting and searching, as exemplified by the SQL SELECT statement, and its ORDER BY clause, are the most frequent, and often the most complex, database operations. These operations are made more difficult by encryption, as the encryption process is designed to obscure the order, and the value, of data items.

Efficiency and Effectiveness

Minimizing encryption and decryption operations, and index updates, are the keys to making this method work efficiently.

With the present invention, most of the data only needs to be decrypted for calculation, for on-screen display, or for printing reports. Overhead added by the present invention is minimal, and its operation is designed to be transparent to the user.

The present invention is designed to be integrated into a database system—it is not a stand-alone system.

The present invention is designed to be independent of the method of data storage. Its implementation will depend on the details of the system that it is integrated into.

Vulnerabilities

Vulnerabilities exist in any system, no matter how well designed. The present invention is designed to have as few vulnerabilities as possible, and we discuss some of the most common Attack Surface characteristics here.

A Virtual Machine attack can be made in either hardware or software. This involves running the present invention on a Virtual Machine, and analyzing its operation. This is the most sophisticated form of attack, and is very difficult to defend against.

Tracing and probing techniques, using a Logic Analyzer, Hardware Emulator, Hardware Debug Support, or JTAG Support are also difficult to defend against, as they cannot usually be detected by the system being traced or probed.

Man In The Middle attacks, using Code Injection, O/S Hooks, and Rootkits are other common attack vectors.

Minimizing the Attack Surface

In securing a system, the goal is to minimize the "Attack Surface" exposed to potential thieves.

The more actions available to a user, or the more resources accessible through these actions, the larger the attack surface. The larger the attack surface, the more likely the system could be successfully attacked, and hence the more insecure it is. Reducing the attack surface will decrease the likelihood of a successful attack, and thereby make a system more secure.

The primary method of minimizing the attack surface is to limit access to the data in unencrypted form. This can be done by limiting physical access to the system, and by limiting the utility of electronic access to the system. Physical access control is not discussed here, as it is not a part of this invention. The potential usefulness of data obtained by electronic access is limited by the use of encryption, and through minimizing exposure of the unencrypted data.

Unencrypted data in the present invention is limited to: the cryptographic encryption/decryption key, the data value to be written, or the value read, and the current search comparison value. Further, the present invention never stores unencrypted data externally (e.g., on disk).

The present invention uses protected RAM, where available. Protected RAM is never written to disk—it is fixed in internal memory. Hardware memory management, including access control, if available, may be further used to secure RAM from access by other programs.

Key obfuscation techniques, such as key "salting", key bit re-ordering, key bit-spreading, etc., may be employed to obscure entries in the Order Data Structure. Note that key obfuscation is not appropriate for entries in the Search Data Structure and must not be used there.

Hardware memory management methods may also be used to further protect the key and the encryption/decryption process.

Encryption/decryption may be run as a protected process, which runs to completion. This implies no preemption by another task, i.e., no interrupts are allowed.

In addition, it is desirable to clear working RAM and registers on return from the encryption process, so as to leave nothing in memory that might help a malicious task to decrypt the data.

The encryption/decryption process may also be run as an O/S service, which will provide further protection in some operating systems.

Possible Solutions

Two possible solutions to this problem were considered:
1. A mathematical encryption function that preserves order. To work, such a function, $f(k, d)$, would have to satisfy the following constraints:

Uniqueness:
$f(k, d)$ is unique for all $\{k, d\}$
Symmetric Keys (this could also be formulated for asymmetric keys):
$f(k, f(k, d))=d$ for all $\{k, d\}$
Ordering:
$f(k, d)=f(k, e)$ iff $d=e$ for all $\{k, d, e\}$
$f(k, d)>f(k, e)$ iff $d>e$ for all $\{k, d, e\}$
$f(k, d)<f(k, e)$ iff $d<e$ for all $\{k, d, e\}$
where:
k=encryption/decryption key
d=data value
e=data value A function satisfying all of these requirements may be difficult or impossible to produce, as part of what makes encryption work is destroying order, so that the unencrypted values of the data are unlikely to be discovered by cryptanalysis.

Since the first solution may not be feasible, a second approach was developed:
2. A data structure that preserves order for sorts and searches, but contains no unencrypted data.

Data structures are commonly used for sorting and searching. (c.f., Donald Knuth, "The Art of Computer Programming, Vol. 3: Sorting and Searching").

Several possible architectures implementing the present invention can be devised. These architectures all depend on keeping two synchronized data structures for indexing encrypted columns in the Storage Data Structure 110: a Search Data Structure 122, for rapidly finding a specific piece of data, and an Order Data Structure 128, for sorting the data, each of which is optimized for that purpose. Using two data structures to index the data provides for both encryption, and ease of sorting and searching.

When creating the database table, (which may be any addressable data structure, with rows and columns, or records and fields—flat file, RDBMS, etc.), two data structures for each encrypted column are created—an Order Data Structure 128, and a Search Data Structure 122.

By keeping these data structures for each column of encrypted data, and maintaining data encryption, it is possible to do sorts and searches with little or no decryption required.

Both the Order and Search data structures only store pointers and encrypted data.

The Order Data Structure 128 is organized by unencrypted value, while the Search Data Structure 122 is organized by encrypted value.

These data structures are used as indices to access a Storage Data Structure 110, which may be implemented in local memory, or implemented on an external storage device. The Storage Data Structure 110 must be addressable by row and column. A single value is stored at the intersection of each row and column address.

When creating or updating the Order Data Structure 128, only two pieces of data need to be unencrypted: the new entry, and one entry from the Order Data Structure 128. The same conditions hold for the Search Data Structure 122. The bulk of the data only needs to be decrypted for on-screen display, for calculation, or for printing reports. In all other operational cases the data remains encrypted The data structures need only support a minimal API, and the exact forms of implementation will depend on application requirements.

For example, the Order Data Structure 128 might be implemented with a Skip List structure, while the Search Data Structure 122 might be a form of Balanced Binary Tree, or even another Skip List. Various implementations of these data structures are well described in the literature, and are not further described in detail here.

Other data structures are possible, and offer various operational efficiencies. Those chosen will depend on the needs of the application. Only functional equivalence at the API level is required.

By keeping these data structures for each column of encrypted data, and maintaining data encryption, it is possible to do sorts and searches with little or no decryption required.

When creating or updating the Order Data Structure 128, only two pieces of data need to be unencrypted: the new entry, and one entry from the Order Data Structure 128.

The bulk of the data needs only to be decrypted for on-screen display, for calculation, or for printing reports. In all other operational cases the data remains encrypted.

Efficiency Considerations

Minimizing encryption/decryption operations, and index updates, are important to making the invention work efficiently.

Insertion operations have the highest computational overhead, as both the Order Data Structure 128 and the Search Data Structure 122 have to be updated. A similarly large computational overhead exists in deletion operations.

Update operations will involve changes to the Order Data Structure 128 and the Search Data Structure 122, as well as changes to the Storage Data Structure 110.

Merge operations can also be done between data indexed by the present invention with a minimal amount of unencrypted data exposure. Only the key fields in the two current records in the merge process need be decrypted at any given stage of the merge.

Choice of data structures for implementation determines the performance characteristics of this system. Which data structures are chosen will depend on the needs of the application.

Scalability

The present invention is easily scalable, and can be implemented as either an Internal or External sort. Care in implementation will result in sort stability, which is required for multi-column sorting.

Advantages

The present invention provides the following advantages over other possible solutions:

1. It has a low overhead. Encryption and decryption operations are kept to the minimum needed to process the data.

2. It may be a software-only solution. All of the algorithm may be implemented entirely in software.

3. It may be implemented in software with hardware assistance. Specialized encryption and decryption hardware, as well as data structure manipulation hardware, may be used to speed up critical parts of the algorithm, if desired.

4. It is a modular solution. The present invention uses a plug-in architecture to allow for maximum flexibility in implementation. Parts of the algorithm may be replaced without functionally disturbing the remainder of the algorithm.

5. The same index structures used for indexing encrypted data columns may also be used for indexing unencrypted data columns, resulting in a speed increase in sorts of those columns.

6. The present invention is easily scalable, and can be implemented as either an Internal or External sort.

7. The present invention is independent of the underlying operating system architecture, and in some implementations need not even interact directly with it.

8. The present invention is independent of the underlying hardware architecture, but may be implemented in a manner that takes advantage of available hardware features.

9. The present invention is independent of the language used in its implementation. It may be implemented in assembly language, interpreted code, or a higher level compiled language, as appropriate to a particular method of implementation.

10. The present invention is independent of the form of the associated storage structure with which it is used.

System-Independent Definition of Functionality

As is common practice in Computer Science, an API-based model of the system is described. Only the details of the interface, and the functionality it represents, are detailed. This approach allows flexibility in the choice of implementation. Multiple implementations are possible, and it is assumed that the implementer will select for optimization according to application needs.

The description that follows is based on the use of an abstract model, composed of system-independent descriptions of data structures, and operations on them. While this is an object-oriented description, it does not imply, or require, an object-oriented implementation.

The structure of the present invention follows the structure intrinsic to the problem. The preferred implementation of the present invention uses a plug-in architecture, allowing the basic structure to remain stable, while the details of the implementation are free to be changed as needed.

Data Structures

The preferred implementation of the present invention is based on the following abstract data structure objects:

Storage Data Structure

The Storage Data Structure 110, as implemented by the StorageSystem data structure, is the repository for the data stored in the database.

The Storage Data Structure 110 is addressable by row and column. A single value is stored at the intersection of each row and column address. The size of this value is not specified here, as it is implementation dependent.

The Storage Data Structure 110 may be implemented in local memory, or implemented on an external storage device. The implementation of the Storage Data Structure 110 need not incorporate encryption support, as all encryption methods are provided by the plug-in architecture of the present invention.

Order Data Structure

The Order Data Structure 128, as implemented by the OrderStructure data structure, allows range comparisons between encrypted values, and facilitates sorts.

The Order Data Structure 128 is ordered by the unencrypted value of the search key.

When creating or updating the Order Data Structure 128, only two pieces of data need to be in unencrypted form: the new entry, and one entry from the Order Data Structure 128. In all other cases the data remains in encrypted form.

A search of the Order Data Structure 128 for a specific search value will return either a pointer to the data structure entry that holds the list of records having the search value, or a pointer to the data structure entry preceding the place where the search value belongs (the new data structure entry insertion site).

Searches for a range of values are done with the Order Data Structure 128. This requires that the currently examined entry in the Order Data Structure 128 be temporarily decrypted in RAM for comparison to the limit being established.

Once the relative positions of A and B in the Order Data Structure 128 are found, the records which lie between them can be retrieved by simply traversing the Order Data Structure 128 from A to B.

Sorts are trivial, as the Order Data Structure 128 is kept in sorted order according to the unencrypted value of the data. A sort only requires traversal of the Order Data Structure 128 in the appropriate ascending or descending direction.

Search Data Structure

Searches for a specific value are done with the Search Data Structure 122, as implemented by the SearchStructure data structure, using the encrypted value of the data to be searched for as a search key.

The Search Data Structure 122 is ordered by the encrypted value of the search key.

A search of the Search Data Structure 122 for a specific search value will return either a pointer to the data structure entry which has the list of records having the search value, or a pointer to the data structure entry preceding the place where the search value belongs (the insertion site for the new data structure entry).

Data Types

The following abstract data types are used in the operation of the preferred implementation of the present invention. Each type is implementation dependent. These definitions are intended to guide the selection of an appropriate implementation, and should be considered to be the minimum requirements necessary for that implementation.

RecordStructure

This data type defines the structure of a Record as it exists in the Storage Data Structure 110 as implemented by the StorageStructure object. It contains an entry for each Column in the Record.

Each column entry may be of an implementation dependent data type, which is determined by the needs of the application, and the available data types in the implementation. These entries may be a simple value, a value structure, or a pointer to a simple value or a value structure.

RecordID

This data type defines a unique identifier for a record. It will typically be implemented as a relative index number, which may be a 0-based or 1-based integer value, whose size is implementation dependent.

StorageAddress

This data type is the implementation dependent unique address of a Record in the StorageSystem object. It may be a simple value, (e.g. relative storage unit index), or value structure, (e.g. device, track, sector, offset, length).

OrderEntry

This data type defines the structure of a node entry in the OrderStructure object. This data type is implementation dependent, but, assuming a Skip List implementation, each node will typically require a key entry, a data entry, 1 or more forward pointers, and 1 or more backward pointers.

SearchEntry

This data type defines the structure of a node entry in the SearchStructure. This data type is implementation dependent, but, assuming a Balanced Binary Tree implementation, each node will typically require a key entry, a left pointer, a right pointer, and a list, or pointer to a list, of RecordID entries that point to RecordStructure entries having the same key.

ClearValueType

This data type defines the structure of an unencrypted value. This data type is implementation dependent, and may be a simple value, or a pointer to a value structure.

EncryptedValueType

This data type defines the structure of an encrypted value. This data type is implementation dependent, and may be a simple value, or a pointer to a value structure.

KeyType

This data type defines the structure of a key value. This data type is implementation dependent, and may be a simple value, or a pointer to a value structure.

AlgType

This data type is a pointer to an encryption algorithm or a decryption algorithm. The pointer must specify the address of an appropriate plug-in cryptographic algorithm. The specified algorithm is implementation dependent.

ErrorCode

This data type defines the form of an error code. This data type is implementation dependent, and may be a simple value, or a pointer to a value structure.

Integration with the Database Management System

There are four areas of operation of the host database management system into which the present invention must be integrated:

Setup (DBMS CREATE Operation)

During the initial creation of the database, the supporting data structures for the present invention must be created. This will be done based on the information given to the host database management system regarding which columns are to be encrypted.

Startup

During startup of the host database management system it is necessary to obtain the encryption key(s) from the user. This must be done in a secure manner, not further specified here.

Run (DBMS INSERT, DELETE, and SELECT Operations)

During the operation of the host database management system it will be necessary to query, and possibly update, the data structures maintained by the present invention.

These operations are further specified in the "API Details", following this section.

Shutdown

Shutdown of the present invention consists of clearing all cryptographic key information, and working memory, from system memory. Since all but the cryptographic key information, and possibly the working memory, are in encrypted form, clearing them is necessary and sufficient to terminate the operation of the present invention.

API Details

StorageSystem Methods

These methods are used to access the StorageSystem object, which may be implemented in local memory, or implemented on an external storage device.

| RecordID | insert( RecordStructure recordValue) |
|---|---|

This method adds the RecordStructure parameter recordValue to the StorageSystem object. It returns a RecordID that provides a unique address in the StorageSystem object for the RecordStructure just added.

If the StorageSystem object is unable to satisfy the request, a NULL value will be returned. The reason for the failure of the request may be examined by using the getLastError( ) method, described below.

| RecordStructure | read( RecordID whichRecord) |
|---|---|

This method returns a pointer to the RecordStructure stored at the given RecordID in the StorageSystem object. A NULL pointer will be returned if the RecordID is invalid. The reason for the failure of the request may be examined by using the getLastError( ) method, described below.

| boolean | update( RecordID whichRecord, RecordStructure recordValue) |
|---|---|

This method replaces the RecordStructure addressed by the which Record parameter with the RecordStructure specified by the recordValue parameter.

The boolean value true is returned if the update is successful. The boolean value false is returned if the update fails. The reason for the failure of the request may be examined by using the getLastError( ) method, described below.

| StorageAddress | convertIDtoAddress( RecordID whichRecord) |
|---|---|

This method returns an implementation dependent value for the StorageAddress corresponding to the RecordID specified by which Record.

| RecordID | convertAddressToID( StorageAddress whichAddress) |
|---|---|

This method returns an implementation dependent value for the RecordID corresponding to the StorageAddress specified by whichAddress.

ErrorCode getLastError( )

This method returns a value indicating the reason for the failure of the last method invoked on the Storage System. The value is implementation specific, and is not further defined here.

OrderStructure Methods

These methods define the API for communicating with the OrderStructure object.

| OrderEntry | add( KeyType columnKey, ClearValueType clearKeyValue, RecordID whichRecord) |
|---|---|

This method adds the record specified by which Record to the OrderStructure object with the key value specified by clearKeyValue using the encryption key specified by columnKey.

If a record with the specified key value already exists the new record will be added to the end of the list of records with that key value. A pointer to the added entry is returned. A NULL pointer may be returned if the method is unable to add the record. The reason for the failure of the request may be examined by using the getLastError( ) method, described below.

| boolean | remove(KeyType columnKey, ClearValueType clearKeyValue, RecordID whichRecord) |
|---|---|

This method removes the first record specified by which Record from the OrderStructure object with the key value specified by clearKeyValue using the encryption key specified by columnKey.

The boolean value true is returned if the deletion is successful. The boolean value false is returned if the deletion fails. The reason for the failure of the request may be examined by using the getLastError( ) method, described below.

| boolean | remove( KeyType columnKey, OrderEntry whichEntry) |
|---|---|

This method removes the OrderEntry specified by whichEntry from the OrderStructure object using the encryption key specified by columnKey.

The boolean value true is returned if the deletion is successful. The boolean value false is returned if the deletion fails. The reason for the failure of the request may be examined by using the getLastError( ) method, described below.

| OrderEntry | find( KeyType columnKey, ClearValueType clearKeyValue) |
|---|---|

This method locates the OrderEntry in the OrderStructure object specified by clearKeyValue using the encryption key specified by columnKey.

A pointer to the first OrderEntry corresponding to clearKeyValue is returned if one is found. A NULL pointer will be returned if no such record exists.

| OrderEntry | getNextEntry( KeyType columnKey) |
|---|---|

This method locates the next OrderEntry in the OrderStructure object using the encryption key specified by columnKey.

A NULL pointer is returned if find( ) returned NULL, i.e. if there are no more entries in the list.
ErrorCode getLastError( )

This method returns a value indicating the reason for the failure of the last method invoked on the OrderStructure object. The value is implementation specific, and is not further defined here.

SearchStructure Methods

These methods define the API for communicating with the SearchStructure object.

| SearchEntry | add( KeyType columnKey, ClearValueType clearValue, RecordID whichRecord) |
|---|---|

This method adds the record specified by whichRecord to the SearchStructure object with the key value specified by clearKeyValue using the encryption key specified by columnKey.

If a record with the specified key value already exists the new record will be added to the end of the list of records with that key value. A pointer to the added entry is returned. A NULL pointer may be returned if the method is unable to add the record. The reason for the failure of the request may be examined by using the getLastError( ) method, described below.

| boolean | remove( KeyType columnKey, ClearValueType value, RecordID whichRecord) |
|---|---|

This method removes the record specified by whichRecord from the SearchStructure object with the key value specified by clearKeyValue using the encryption key specified by columnKey.

The boolean value true is returned if the deletion is successful. The boolean value false is returned if the deletion fails. The reason for the failure of the request may be examined by using the getLastError( ) method, described below.

| boolean | remove( KeyType columnKey, SearchEntry whichEntry) |
|---|---|

This method removes the SearchEntry specified by whichEntry from the SearchStructure object using the encryption key specified by column Key.

The boolean value true is returned if the deletion is successful. The boolean value false is returned if the deletion fails. The reason for the failure of the request may be examined by using the getLastError( ) method, described below.

| SearchEntry | find(KeyType columnKey, ClearValueType clearValue) |
|---|---|

This method locates the SearchEntry in the SearchStructure object specified by clearKeyValue using the encryption key specified by columnKey.

A pointer to the first SearchEntry corresponding to clearKeyValue is returned if one is found. A NULL pointer may be returned if no such record exists.

| SearchEntry | getNextEntry( KeyType columnKey) |
|---|---|

This method locates the next SearchEntry in the SearchStructure object using the encryption key specified by columnKey.

A NULL pointer is returned if there are no more entries in the list.
ErrorCode getLastError( )

This method returns a value indicating the reason for the failure of the last method invoked on the SearchStructure object.

The returned value is implementation specific, and is not further defined here.

Encryption Algorithm Methods

These methods specify the API for the algorithm(s) used for encrypting and decrypting data.

| EncryptedValueType | encrypt( AlgType encryptor, KeyType keyValue, ClearValueType clearValue) |
|---|---|

This method returns the encrypted value corresponding to clearValue using the encryption key keyValue and the plug-in encryption algorithm specified by encryptor.

| ClearValueType | decrypt( AlgType decryptor, KeyType keyValue, EncryptedValueType encryptedValue) |
|---|---|

This method returns the clear value corresponding to encryptedValue using the decryption key keyValue and the plug-in decryption algorithm specified by decryptor.

Now turning to the Figures, note that in the following description, for the purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention. For example, only the forward pointers in list data structures are shown, while a specific implementation may use both forward and backward pointers.

Reference is made to the accompanying drawings which form a part hereof, and in which is shown by way of illustration a specific embodiment in which the invention may be practiced. It is to be understood that other embodiments may be utilized without departing from the scope of the present invention.

Systems that implement the present invention are not limited to any particular type of Storage Data Structure 110, Search Data Structure 122, or Order Data Structure 128. However, for the purpose of explanation, the examples and terminology used herein shall be that typically associated with relational databases. Thus, the terms "table", "row" and "column" shall be used herein to refer respectively to the Storage Data Structure 110, a record within that structure, and a field within that record. Any data structure in which groups of related fields are associated into records may be used.

In the following, the term "Storage Data Structure" 110 refers to the StorageStructure defined in the API descriptions, the term "Search Data Structure" 122 refers to the SearchStructure defined in the API descriptions, and the term "Order Data Structure" 128 refers to the OrderStructure defined in the API descriptions.

Figure 1:
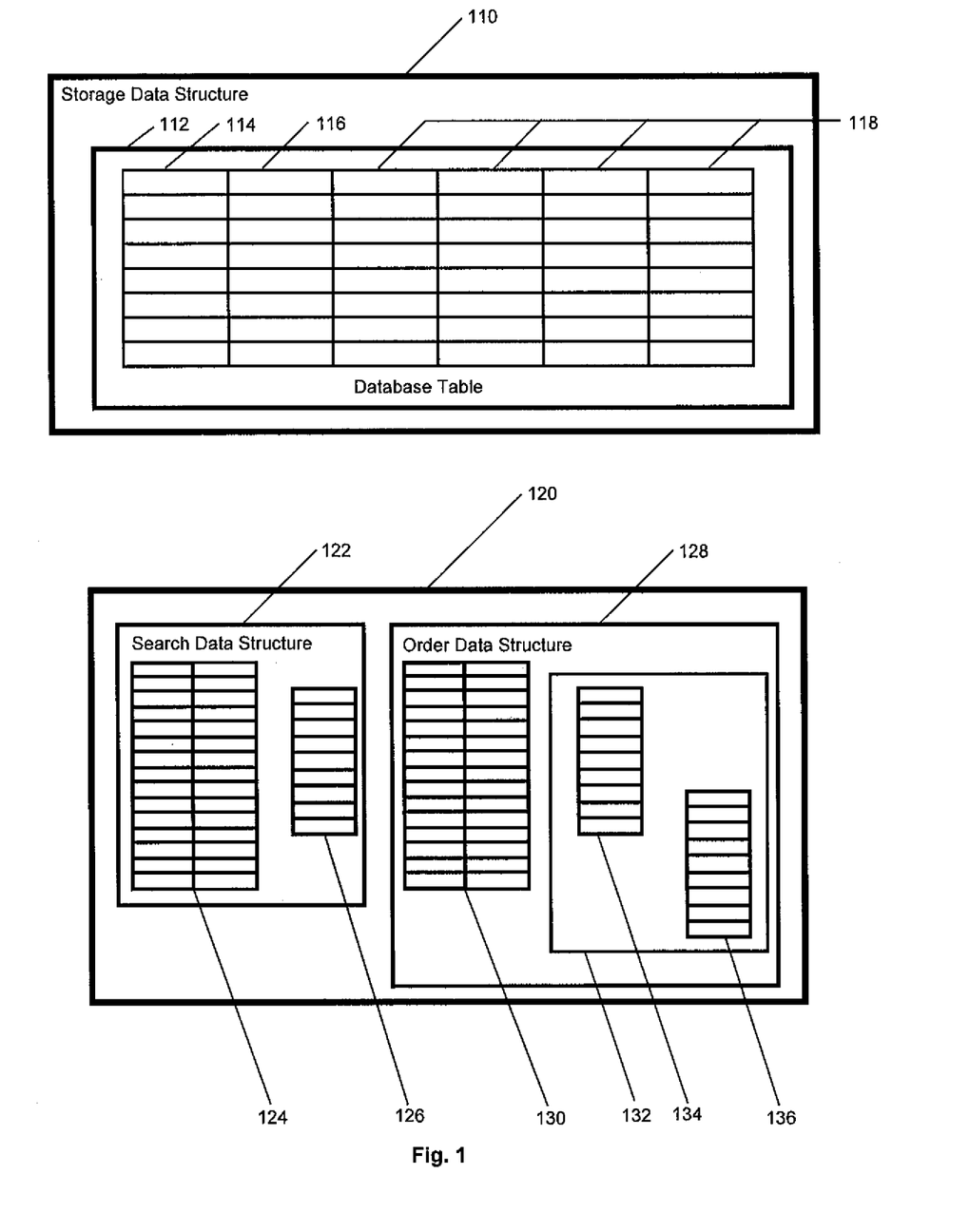
FIG. 1 provides an overview of the preferred Data Structures of the present invention.

The essence of this invention, as shown in the overview of FIG. 1, lies in the use of a pair of synchronized indices 120 to perform searches and sorts of encrypted data in a Storage Data Structure 110 while minimizing the number of cryptographic operations and keeping a minimal amount of unencrypted data in internal processor memory.

The contents of the search key values in the Search Data Structure Key and Pointer Structure 124, and Order Data Structure Key and Pointer Structure 130, are kept in encrypted form.

The Storage Data Structure 110 stores data, addressed as rows and columns, in a Database Table 112 containing both encrypted and unencrypted, (cleartext), columns.

The Database Table 112 contains at least one encrypted column 116, and may contain zero or more unencrypted cleartext columns 114, 118.

Each encrypted column 116 is indexed by a pair of indices 120, consisting of a Search Data Structure 122, and an Order Data Structure 128.

The Search Data Structure 122 is used to locate a specific record, or records, which contain a specified search key value.

Within the Search Data Structure 122 are a Search Data Structure Key and Pointer Structure 124, and an associated Search Data Structure Record List 126.

The Search Data Structure Key and Pointer Structure 124 is kept in order by the encrypted values stored therein.

The Search Data Structure Key and Pointer Structure 124 is used to determine the location of the Search Data Structure Record List 126 which contains the record identifier of the first, or only, record containing the desired value.

Figure 2:
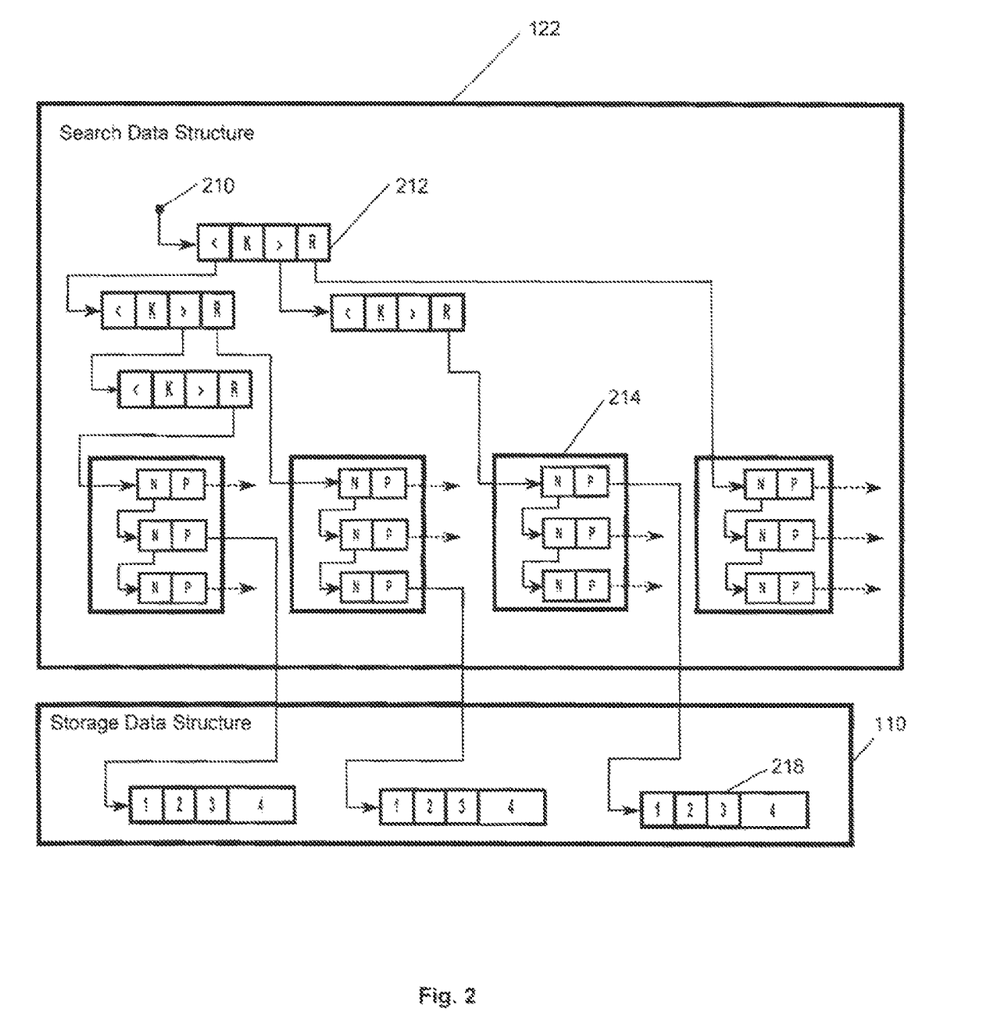
FIG. 2 describes the Search Data Structure 122.

In FIG. 2, using a Binary Tree as an example implementation of the Search Data Structure 122, search begins at the Root Node 212 referenced by the Search Data Structure Root Pointer 210, and proceeds with a binary search through the nodes of the tree until the node with the desired data value is found, or until the search fails.

If the desired value exists in the Search Data Structure 122, a pointer to the Order Data Structure Record List 214 referencing records containing that value is returned.

If no matching record is found an error code will be returned.

If there are multiple records containing the desired value they will be referenced by subsequent entries in the Search Data Structure Record List 126.

The Order Data Structure 128 is used to select a range of records in the Storage Data Structure 110.

Within the Order Data Structure 128 are an Order Data Structure Key and Pointer Structure 130, and an Order Data Structure Record List 132 containing a pair of associated Order Data Structure Record List Entries 134, 136.

The Order Data Structure Key and Pointer Structure 130 is kept in order by the encrypted values stored therein.

The Order Data Structure Key and Pointer Structure 130 is used to determine the location of the Order Data Structure Record List Entry 134, which contains the record identifier of the first, or only, record containing the lowest desired value, and the location of the Order Data Structure Record List Entry 136, which contains the record identifier of the first, or only, record containing the highest desired value.

Figure 3:
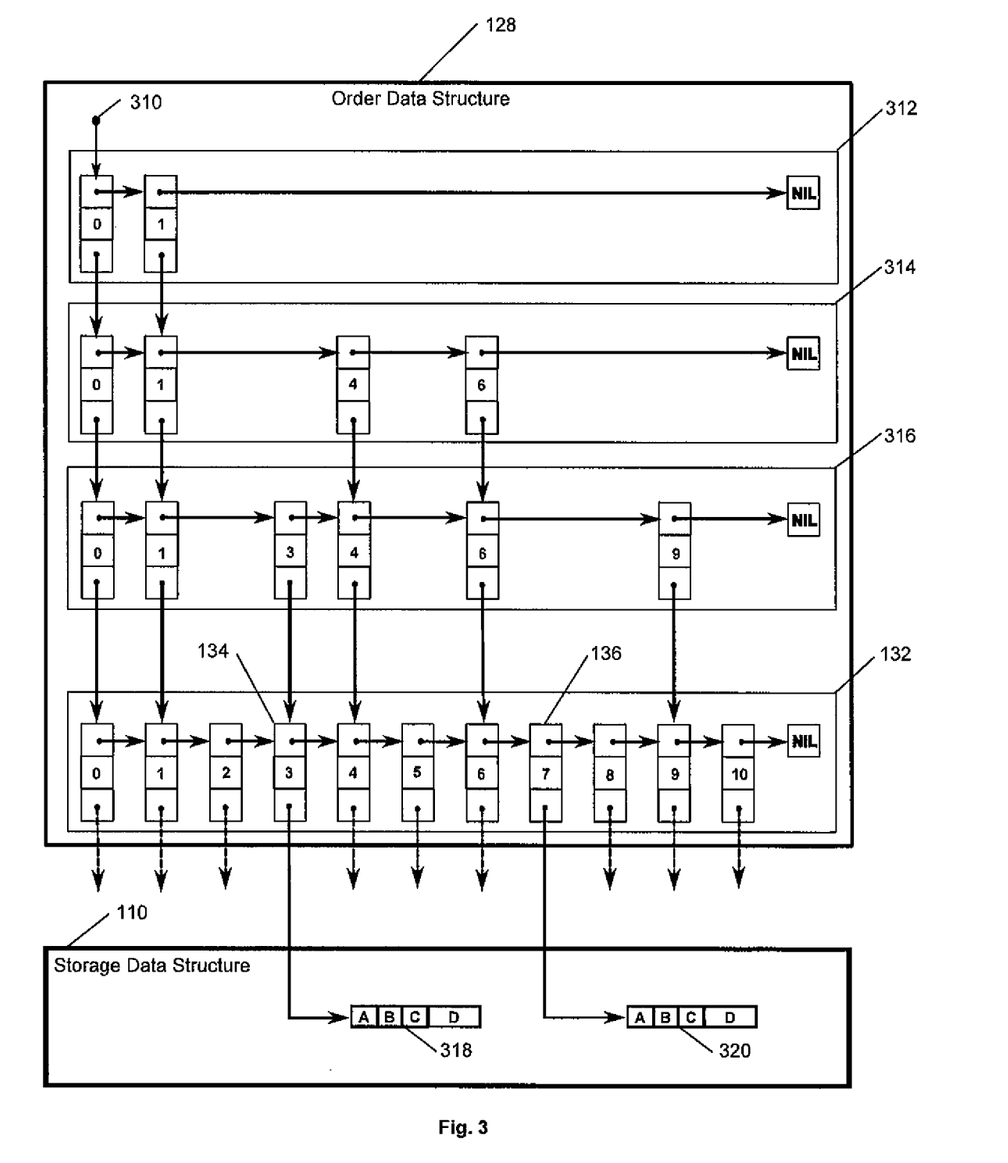
FIG. 3 describes the Order Data Structure 128.

In FIG. 3, using a Skip List as an example implementation of the Order Data Structure 128, search begins at the Root Node Pointer 310 and proceeds through the skip indices 314, 315, 316 until it finds the two entries 318, 320 whose key values begin 318 and end 320 the desired range.

The Order Data Structure Record List 132 is then traversed, in either ascending or descending order, to retrieve the records included within the desired range.

If there are multiple records containing the lowest desired value they will be referenced by subsequent entries in the Order Data Structure Record List Entry 134.

If there are multiple records containing the highest desired value they will be referenced by subsequent entries in the Order Data Structure Record List Entry 136.

Traversing the records beginning with the record or records in Order Data Structure Record List Entry 134 and ending with the record or records in Order Data Structure Record List Entry 136 yields a set of records in ascending order.

Traversing the records beginning with the record or records in Order Data Structure Record List Entry 136, and ending with the record or records in Order Data Structure Record List Entry 134, yields a set of records in descending order.

When new records are to be added to one of the record list entries 134, 136 they are added to the end of that list entry so as to maintain sort stability.

Multi-column sorts may be accomplished by building temporary copies of the Order Data Structure 128.

These temporary copies are built from traversals of each of the previous temporary copies, the first of which is built from the traversal of the Order Data Structure 128 of the least significant column to be sorted.

Figure 4:
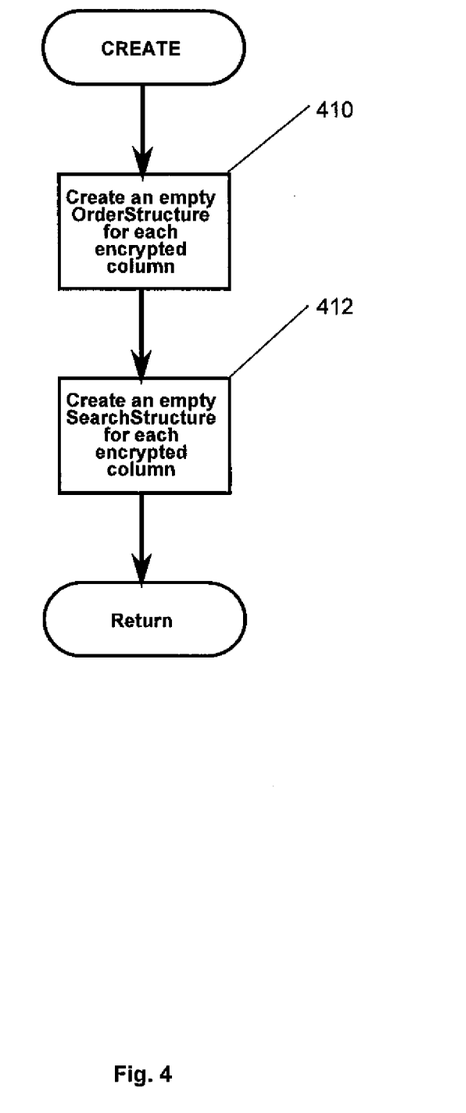
FIG. 4 is a flowchart for the CREATE Operation.

FIG. 4 shows the steps to be performed when creating the database table.

In step 410, create an empty Order Data Structure 128, and in step 412, create an empty Search Data Structure 122 for each new encrypted column 116.

Note that an additional Index Data Structure may be set up for unencrypted columns, if desired, to increase performance for sorts and searches on those columns. This Index Data Structure is not described here, as it is not a part of this invention.

Figure 5:
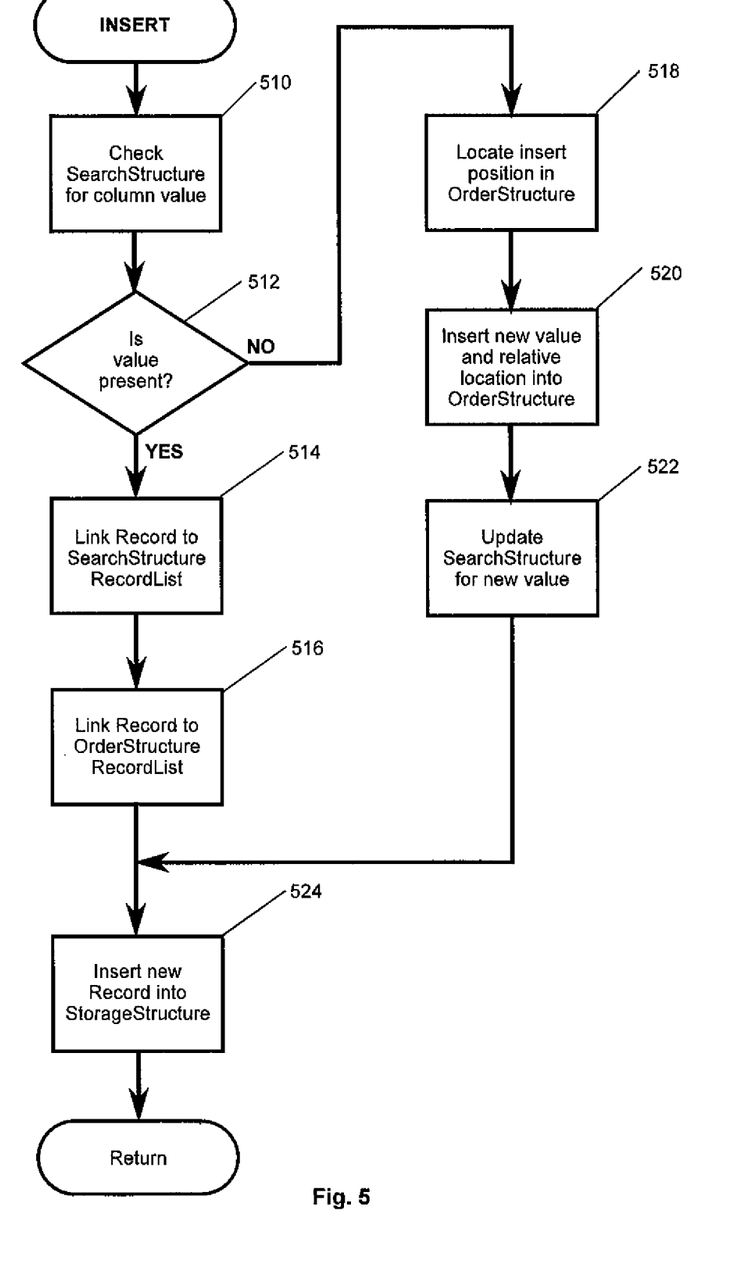
FIG. 5 is a flowchart for the INSERT Operation.

FIG. 5 shows the steps to be performed when adding a new record to the database table.

For each new record, perform the following:
1.0 For each encrypted field:
In step 510, check the Search Data Structure 122 for the column value to be inserted:
In step 512, does the column value exist in the Search Data Structure 122?
1.1 Yes—it exists:
1.1a. In step 514, the Search Data Structure 122 is updated to link to the new record
1.1b. In step 516, the Order Data Structure 128 is updated to link to the new record 1.2 No—it doesn't exist:

1.2a. In step 518, locate its position in the Order Data Structure 128

1.2b. In step 520, update the Order Data Structure 128 to contain an entry with the encrypted column value and its record location in the Storage Data Structure 110.

1.2c. In step 522, update the Search Data Structure 122 to contain an entry for the new encrypted column value, including the record location in the Storage Data Structure 110.

2.0 In step 524, insert the new record into the Database Table 112 in the Storage Data Structure 110.

This step involves allocating storage space in the Storage Data Structure 110, creating the mapping from RecordID to StorageAddress, and inserting the record into the Storage Data Structure 110.

Note that an insertable position value, such as Ted Nelson's "Tumblers", could be used to reduce the need for reorganizing the Order Data Structure 128 when an insert operation would cause a location value collision with that of an existing record.

Figure 6:
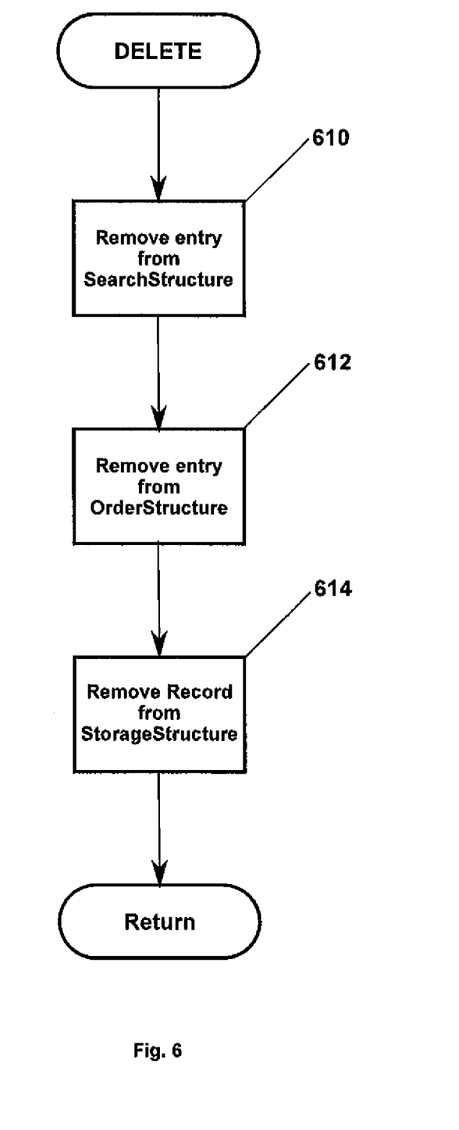
FIG. 6 is a flowchart for the DELETE Operation.

FIG. 6 shows the steps to be performed when deleting a record.

In step 610, the index entry for the record is removed from the Search Data Structure 110.

In step 612, the index entry for the record is removed from the Order Data Structure 514.

In step 614, the record is removed from the Storage Data Structure 110.

As well understood by one of ordinary skill in the art, certain details will depend upon the particular application in which the invention is applied. Certain of such details are next discussed.

With the present invention, most of the data only needs to be decrypted for calculation, for on-screen display, or for printing reports. Overhead added by the present invention is minimal, and its operation is designed to be transparent to the user.

The present invention is designed to be independent of the method of data storage. Its implementation will depend on the details of the system that it is integrated into.

The present invention uses protected RAM, where available. Protected RAM is never written to disk—it is fixed in internal memory. Hardware memory management, including access control, if available, may be further used to secure RAM from access by other programs.

Key obfuscation techniques, such as key "salting", key bit re-ordering, key bit-spreading, etc., may be employed to obscure entries in the Order Data Structure. Note that key obfuscation is not appropriate for entries in the Search Data Structure and must not be used there.

Hardware memory management methods may also be used to further protect the key and the encryption/decryption process.

Encryption/decryption may be run as a protected process, which runs to completion. This implies no preemption by another task, e.g. no interrupts are allowed.

In addition, it is desirable to clear working RAM and registers on return from the encryption process, so as to leave nothing in memory that might help a malicious task to decrypt the data.

The encryption/decryption process may also be run as an O/S service, which will provide further protection in some operating systems.

The data structures need only support a minimal API, and the exact forms of implementation will depend on application requirements.

For example, the Order Data Structure 128 might be implemented with a Skip List structure, while the Search Data Structure 122 might be a form of Balanced Binary Tree, or even another Skip List.

Other data structures are possible, and offer various operational efficiencies. Those chosen will depend on the needs of the application. Only functional equivalence at the API level is required.

By keeping these data structures for each column of encrypted data, and maintaining data encryption, it is possible to do sorts and searches with little or no decryption required.

When creating or updating the Order Data Structure 128, only two pieces of data need to be unencrypted: the new entry, and one entry from the Order Data Structure 128.

The bulk of the data needs only to be decrypted for on-screen display, for calculation, or for printing reports. In all other operational cases the data remains encrypted.

Choice of data structures for implementation determines the performance characteristics of this system. Which data structures are chosen will depend on the needs of the application.

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of using synchronized search and order data structures to access a collection of data stored on a non-transitory computer-readable medium, the method comprising the following steps performed by a hardware database server:

organizing the search data structure by encrypted key value, wherein the search data structure contains only references to elements in the collection and their associated encrypted keys;

organizing the order data structure by unencrypted key value, wherein the order data structure contains only references to elements in the collection and their associated encrypted keys, and wherein the order data structure is a single order data structure created and updated as the data in the associated column changes;

exposing a maximum of two pieces of clear text data during operations on the collection, wherein all data remains encrypted with the exception of one or two pieces necessarily kept unencrypted during data structure updates after insert or update operations;

engaging in insert or delete operations by searching and updating the search data structure and the order data structure to insert or delete associated elements of the collection;

engaging in update operations by searching the search data structure for the desired elements of the collection and updating their associated values, by comparing the decrypted values from the data structures with clear values of the changed or updated data so that it is known where to update the data structures;

engaging in search operations by searching the search data structure according to a search key;

engaging in sort operations by searching the order data structure to locate a range of values and then traversing the order data structure in a desired direction;

engaging in merge operations by traversing and selecting entries from two or more order data structures; and reporting the results of those operations to a user.

2. The method of claim 1 employing an application program interface and a plug-in architecture for data structure and cryptographic operations to minimize dependence on specific implementations.

3. The method of claim 1 wherein the method is implementation independent as to choice of either or both of hardware and software.

4. The method of claim 1 wherein the search and order data structures comprise a composite data structure.

5. The method of claim 1 wherein organizing the order data structure employs key obfuscation.

6. The method of claim 5 wherein key obfuscation comprises one or more of key salting, key bit re-ordering, or key bit spreading.

7. The method of claim 1 additionally comprising the step of clearing the working memory of a computer after a data structure operation is complete to prevent retrieval of clear text data.

8. The method of claim 1 additionally comprising executing the method on a computer employing protected working memory.

9. The method of claim 1 additionally comprising executing the method on a computer employing protected processes.

10. The method of claim 1 wherein the collection of data is a collection of encrypted data.

11. The method of claim 1 wherein the collection of data is a collection of unencrypted data.

12. The method of claim 1 wherein engaging in sort operations comprises engaging in multi-column sort operations.

13. The method of claim 1 wherein engaging in insert operations comprises employing insertable position values.

14. The method of claim 1 wherein engaging in sort operations comprises engaging in an internal or external sort and wherein engaging in merge operations comprises engaging in an internal or external merge.

* * * * *